US009077869B2

(12) United States Patent
Tripathi et al.

(10) Patent No.: US 9,077,869 B2
(45) Date of Patent: Jul. 7, 2015

(54) METHOD AND APPARATUS FOR DETECTION AND REMOVAL OF RAIN FROM VIDEOS USING TEMPORAL AND SPATIOTEMPORAL PROPERTIES

(75) Inventors: Abhishek Kumar Tripathi, Kharagpur (IN); Sudipta Mukhopadhyay, Kharagpur (IN)

(73) Assignee: Indian Institute of Technology, Kharagpur, West Bengal, Kharagpur (IN)

( * ) Notice: Subject to any disclaimer, the term of this patent is extended or adjusted under 35 U.S.C. 154(b) by 162 days.

(21) Appl. No.: 13/885,564

(22) PCT Filed: Nov. 11, 2011

(86) PCT No.: PCT/IN2011/000778
§ 371 (c)(1),
(2), (4) Date: May 15, 2013

(87) PCT Pub. No.: WO2012/066564
PCT Pub. Date: May 24, 2012

(65) Prior Publication Data
US 2013/0242188 A1    Sep. 19, 2013

(30) Foreign Application Priority Data

Nov. 15, 2010 (IN) .......................... 1284/KOL/2010

(51) Int. Cl.
*G06K 9/00* (2006.01)
*H04N 5/21* (2006.01)
(Continued)

(52) U.S. Cl.
CPC ........ *H04N 5/21* (2013.01); *G06T 5/005* (2013.01); *G06T 2207/10016* (2013.01); *G06T 2207/20182* (2013.01); *H04N 11/20* (2013.01)

(58) Field of Classification Search
CPC ........ H04N 11/20; H04N 5/21; H04N 5/232; G06T 7/0002; G06T 2207/30242; G01W 1/14; G06K 9/346
USPC .................. 382/162, 165, 167, 274; 348/453; 345/589, 591, 593, 596, 597, 600, 601, 345/603, 604
See application file for complete search history.

(56) References Cited

U.S. PATENT DOCUMENTS

| 3,758,211 A | 9/1973 | Bateman et al. |
| 4,768,513 A | 9/1988 | Suzuki |

(Continued)

OTHER PUBLICATIONS

International Search Report dated Apr. 12, 2012 for PCT App. No. PCT/IN2011/000778.

(Continued)

*Primary Examiner* — Ali Bayat
(74) *Attorney, Agent, or Firm* — D'Ambrosio & Menon, PLLC; Usha Menon

(57) ABSTRACT

The invention relates to a new method and system for detection and removal of rain from video using temporal/spatiotemporal properties. Advantageously, the temporal/spatiotemporal properties are involved to separate the rain pixels from the non-rain pixels. It is thus possible by way of the present invention to involve less number of consecutive frames, reducing the buffer size and delay. It works only on the intensity plane which reduces the complexity and execution time significantly along with accurate rain detection. This new technique does not assume the shape, size and velocity of the raindrops which makes it robust to different rain conditions. This method reduces the buffer size which reduces the system cost, delay and power consumption while maintaining sufficient quality of rain detection.

8 Claims, 5 Drawing Sheets

(51) Int. Cl.
*G06T 5/00* (2006.01)
*H04N 11/20* (2006.01)

(56) References Cited

U.S. PATENT DOCUMENTS

| | | | |
|---|---|---|---|
| 4,773,097 A | | 9/1988 | Suzaki et al. |
| 4,837,579 A | * | 6/1989 | Pease et al. .................. 342/197 |
| 4,845,501 A | * | 7/1989 | Pease et al. .................. 342/185 |
| 5,535,314 A | * | 7/1996 | Alves et al. .................. 382/165 |
| 7,660,517 B2 | | 2/2010 | Garg et al. |
| 2007/0053671 A1 | * | 3/2007 | Garg et al. ................... 396/77 |

OTHER PUBLICATIONS

Tripathi A K et al: "A probabilistic approach for detection and removal of rain from videos;" Journal of the Institution of Electronics and Telecommunication Engineers. New Dehli vol. 57. No. 1. Feb. 1, 2011.

Kshitiz Garg et al: "Vision and Rain;" International Journal of Computer Vision. Kluwer Academic Publishers. BO; vol. 75. No. 1; Feb. 15, 2007; pp. 3-27.

Nathan Brewer et al: "Using the Shape Characteristics of Rain to Identify and Remove Rain from Video;" Dec. 4, 2008. Structural Syntactic and Statistical Pattern Recognition; Springer Berlin Heidelberg; pp. 451-458.

M F Subhani et al: "Low Latency Mitigation of Rain Induced Noise in Images;" 5th European Conference on Visual Media Production (CVMP 2008); Jan. 1, 2008. pp. 1-4.

K. Garg and S.K. Nayar; "When Does a Camera See Rain?" IEEE International Conference on Computer Vision (ICCV), vol. 2, pp. 1067-1074, Oct. 2005.

K. Garg and S.K. Nayar; Detection and removal of rain from videos, IEEE Computer Society Conference on Computer Vision and Pattern Recognition, 1:528-535, 2004.

Xiaopeng Zhang, Hao Li, Yingyi Qi, Wee Kheng Leow, and Teck Khim Ng; "Rain removal in video by combining temporal and chromatic properties;" IEEE international conference on multimedia and expo, 2006.

Peter Barnum, Takeo Kanade, and Srinivasa G Narasimhan; "Spatio temporal frequency analysis for removing rain and snow from videos;" Workshop on Photometric Analysis for Computer Vision (PACV), in conjunction with ICCV, 2007.

P. Barnum, S. G. Narasimhan, and T. Kanade; "Analysis of Rain and Snow in Frequency Space;" International Journal of Computer Vision (IJCV), 2009.

Peng Liu, Jing Xu, Jiafeng Liu, and Xianglong Tang; "Pixel Based Temporal Analysis Using Chromatic Property for Removing Rain from Videos;" Computer and Information science, 2(1):53-50, 2009.

* cited by examiner

METHOD AND APPARATUS FOR DETECTION AND REMOVAL OF RAIN FROM VIDEOS USING TEMPORAL AND SPATIOTEMPORAL PROPERTIES

CROSS-REFERENCE TO RELATED APPLICATIONS

This application is based upon and claims the benefit of priorities from International Application No. PCT/IN2011/000778 filed on Nov. 11, 2011 and Indian Application No.: 1284/KOL/2010 filed Nov. 15, 2010, the entire contents of which are incorporated herein by reference.

FIELD OF THE INVENTION

The present invention relates to a method for detection and removal of rain from videos and, more specifically, to a method for detection and removal of rain from videos involving spatiotemporal properties and devices to carry out such method. This new technique involves temporal or spatiotemporal properties to separate the rain pixels from the non-rain pixels. Advantageously, the method of the invention avoids the limitations of assuming the shape, size and velocity of the raindrops in such detection methodology and hence makes it robust to different rain conditions. The method according to the invention reduces the buffer size which in turn reduces the system cost, delay and power consumption. This method according to the invention is important for the tracking and navigation applications, consumer electronics, entertainment industries and film post production. The invention is directed to produce high perceptual image quality; it has very less execution time due to the requirement of less number of consecutive frames. Removal of rain enhances the performance of this vision. Thus it will get immense importance in laboratories, industry, R&D etc.

BACKGROUND ART

Bad weather affected sequences annoy the human viewer and degrade the perceptual image quality. The challenging weather conditions also degrade the performance of various computer vision method which uses feature information such as object detection, tracking, segmentation and recognition. Thus it is very difficult to implement these computer vision methods robust to weather changes. Based on the type of the visual effects, bad weather conditions are classified into two categories; steady (viz. fog, mist and haze) and dynamic (viz. rain, snow and hail). In steady bad weather, constituent droplets are very small (1-10 μm) and steadily float in the air. Individual detection of these droplets by the camera is very difficult. In dynamic bad weather, constituent droplets are 1000 times larger than those of the steady weather. Due to this large size, these droplets are visible to the video capturing camera.

Rain is the major component of the dynamic bad weather. Rain drops are randomly distributed in 3D space. Due to the high velocity of the rain drops their 3D to 2D projection forms the rain streaks.

It is known in the art that rain effect not only degrades the perceptual video image quality but also degrade the performance of various computer vision algorithm which uses feature information such as object detection, tracking, segmentation and recognition. Thus there has been the need for removal of rain to enhance the performance of these vision algorithms.

There are substantial numbers of research works to find a solution on this subject before this present invention. Earlier technique removes rain effects by adjusting the camera parameters. In which exposure time is increased or depth of field is reduced. Earlier technique is not effective in scenes with heavy rain and fast moving objects that are close to camera.

In past few years many methods have been proposed for the removal of the rain. These methods require certain number of consecutive frames to estimate the rain affected pixels. For removing rain during acquisition Garg and Nayar [K. Garg and S. K. Nayar, When does camera see rain?, IEEE International Conference on Computer Vision, 2:1067-1074, 2005] proposed a method by adjusting the camera parameters. Here exposure time is increased or the depth of field is reduced. However, this method fails to handle heavy rain and fast moving objects which are close to the camera.

Garg and Nayar [K. Garg and S. K. Nayar, Vision and Rain, International Journal of Computer Vision, 75(1):3-27, 2007 & Detection and removal of rain from videos, IEEE Computer Society Conference on Computer Vision and Pattern Recognition, 1:528-535, 2004] assumed that raindrops affect only single frame and very few raindrops affect two consecutive frames. So if a raindrop covers a pixel then intensity change due to rain is equal to the intensity difference between the pixel in current frame and in the later or previous frame. This produces lot of false detection. To reject the false rain pixels it is assumed that raindrops follow the linear photometric constraints. But in heavy rain, raindrops could affect the same position in two or more consecutive frames. Photometric model assumes that raindrops have almost same size and fall at same velocity. It is also assumed that pixels that lie on the same rain streak have same irradiance because the brightness of the drop is weakly affected by the background. It is found that the variation of the size and velocity of raindrops violate the assumptions of the photometric model. This method fails to discriminate between rain pixels and moving objects pixels when rain becomes heavier or lighter in the video or if rain is distributed over a wide range of depth. Thus all the rain streaks do not follow the photometric constraints. Thus gives a lot of miss detection. This method requires 30 consecutive frames for the removal of rain.

Zhang et al [Xiaopeng Zhang, Hao Li, Yingyi Qi, Wee Kheng Leow, and Teck Khim Ng, Rain removal in video by combining temporal and chromatic properties, IEEE international conference on multimedia and expo, 2006] proposed a method based on the chromatic and temporal properties. Chromatic property states that changes of intensities in R, G, and B color components due to the raindrops are approximately same. In practice, these variations across the color components are bound to a small threshold. Temporal property states that a particular pixel position is not always covered by the raindrops in all frames. It is found that slow moving objects also follow this chromatic property. This method uses k-means clustering to estimate the non-rain affected pixel value to inpaint the rain affected pixels. This clustering method is effective only in removing rain from static background when there is no moving object. This method uses all the frames available in a sequence for the removal of the rain.

Barnum et al [Peter Barnum, Takeo Kanade, and Srinivasa G Narasimhan, Spatio temporal frequency analysis for removing rain and snow from videos, Workshop on Photometric Analysis For Computer Vision (PACV), in conjunction with ICCV, 2007 & P. Barnum, S. G. Narasimhan, and T. Kanade, Analysis of Rain and Snow in Frequency Space, International Journal of Computer Vision (IJCV), 2009] proposed a method for the detection and removal of rain streaks by using frequency information of each frame. Here a blurred Gaussian model is used to approximate the blurring produced by the raindrops. This model is suitable when the rain streaks are prominent, but this blurred Gaussian model fails to detect the rain streak when it is not sharp enough.

Liu et al [Peng Liu, Jing Xu, Jiafeng Liu, and Xianglong Tang, Pixel Based Temporal Analysis Using Chromatic Property for Removing Rain from Videos, Computer and information science, 2(1):53-50, 2009] proposed a method for the removal of rain by using chromatic based properties in rain affected videos. It fails to detect all possible rain streaks. The reason could be that chromatic property is not satisfied in practice as described in previous discussion. This method requires at least three consecutive frames for the removal of rain.

U.S. Pat. No. 4,768,513 provides a method and device for measuring and processing light whereby laser light is irradiated onto positions of an organism which has been injected with a fluorescent substance having a strong affinity for tumors, the fluorescence and the reflected light produced by this irradiation are detected, and the detected intensity of the fluorescence is calculated and analyzed by means of the intensity of the reflected light.

The purpose of this invention is to provide a device and method for measuring and processing light which goes far in eliminating the uncertain factors which interfere with quantification of the fluorescence excited and which are caused, for example, by power fluctuations of the laser light for excitement or by fluctuations of the relative positions of the irradiating and detecting fibers and the organism's tissues.

In order to achieve the aforementioned purpose, the method and device according to said prior art comprise a method and device for measuring and processing light in which laser light for producing fluorescence is irradiated onto predetermined positions of an organism which has previously been injected with a fluorescent substance having a strong affinity for tumors, and the intensity of the fluorescence thus produced is detected. The device consists of a light-irradiating device which irradiates the organism with the aforementioned laser light, a light-detecting device which detects and outputs the fluorescence produced by the organism upon excitement by the aforementioned laser light as well as the aforementioned laser light reflected from the organism, and an analyzer unit into which the output signals of this light-detecting device are input and the intensity of the aforementioned fluorescence is calculated and analyzed in terms of the intensity of the reflected light. This method involves calculates and analyzes the intensity of the detected fluorescence based on the intensity of the detected light.

U.S. Pat. No. 4,773,097 provides an image analyzing apparatus for television information signals are supplied concurrently to a display device for reproduction and to a converter network which converts the analogue television information signals into digital signals. The digital signals are then stored in the memory of a computer. To compare the stored signals with the developed television signals, means are provided for retrieving the computer-stored digital words, converting the signals into analogue signals and supplying the converted signals and the developed signals simultaneously to a display device. To correct or modify any portion of the reproduction of the converted signals in relation to the reproduction of the developed signals, a correction circuit is provided for altering the digital bits corresponding to the desired portion of the reproduction.

U.S. Pat. No. 3,758,211 provides an atmospheric visibility measuring apparatus comprises a light projection means for projecting a beam of light into the atmosphere along a prescribed beam path, an optical detection means arranged to respond to light scattered by particles in the atmosphere from within another beam path surrounding an optical axis of the detector, and control apparatus for turning the light beam and the optical axis of the detection means in unison about a horizontal axis which extends substantially from the projection means to the detection means. The light projection means and the optical detection means are relatively mounted so that the optical axis of the detection means always intersects the light beam at a constant angle and at a constant range from the detection means. The control apparatus may comprise a rotatable horizontal shaft supporting the light projection means and the optical detection means. Alternatively a fixed light projector and detector may be arranged to co-operate with two mirrors provided on a rotatable horizontal shaft the mirrors being arranged to direct the light beam into the prescribed beam path and to reflect the scattered light onto the detector. The projection means and the detection means, or just the mirrors which form a part thereof, may be mounted separately and maintained in relative alignment by a follow-up servo system.

According to the said prior art there is provided apparatus for measuring the visibility conditions of the atmosphere including projection means for projecting a beam of light along a first beam path, detection means responsive to light incident on it from within a second beam path, the projection means and the detection means being relatively mounted so that the first and second beam paths will intersect at a predetermined angle and so that the detection means will receive light scattered from the part of the beam where the two beam paths intersect and which is at a predetermined constant range from the detection means, and including control means for rotating the said two beam paths in unison.

The art suggests possible involvement of two mirrors, mounted on opposite ends of a horizontal rotatable shaft at an acute angle to the axis of the shaft, projection means for projecting a beam of light via one mirror, and detection means for detecting scattered light via the other mirror. The projection means may comprise a lamp also mounted on the shaft.

This apparatus is for measuring the visibility conditions of the atmosphere comprising projection means for projecting a beam of light along a first beam path.

U.S. Pat. No. 7,660,517 provides a systems and methods for reducing rain effects in images. The invention is applicable to both still cameras and video cameras, and they are also applicable to both film and digital cameras. In general, they are applicable to any camera system where camera settings can be adjusted before or while images are being acquired.

It is an analytical model for the effects of dynamic weather on acquired images based on the intensity fluctuations caused by such weather. It also provides a method of adjusting camera settings to reduce the visibility of rain with minimal degradation of the acquired image. This method uses one or more inputs from a user to retrieve settings for an image acquisition device from a data repository. These settings are then used to adjust corresponding camera settings. The input from a user can be, at least, the heaviness of the rainfall, the motion of objects in the scene, the distance, of an object to be acquired from the camera, or the near and far distance of the scene. Camera settings that can be adjusted are, at least, the exposure time, the F-number, the focal plane, or the zoom. Although post processing is preferably not required to reduce the visibility of dynamic weather, such as rain, when the present invention is implemented, post-processing may still be applied if camera settings are ineffective, will cause too much image degradation, or to further improve the acquired image. Additionally, automatic detection of certain scene features, such as the heaviness of rainfall, can be performed to partially or totally replace user inputs. With automatic detection of scene features, the entire process of adjusting camera settings can be automated.

A rain gauge may also be provided in accordance with this invention. Camera settings may be adjusted to enhance the visibility of rain. The acquired images are then analyzed to determine the number and size of raindrops, which can be used to compute the rain rate. This method for measuring rain rate is advantageous in that it provides finer measurements, is inexpensive, and is more portable that other types of rain rate measurement devices.

Here exposure time is increased or the depth of field is reduced. However, this method fails to handle heavy rain and fast moving objects which are close to the camera.

It would be clearly apparent from the above state of the art that the presently available systems suffers from some inherent limitations such as assuming the shape and size of the raindrops and working on all the three color components, which adds to the complexity and execution at tiles. There is further known problems of huge buffer size and delay, and more importantly problems of the real time implementation of the algorithm.

OBJECTS OF THE INVENTION

It is the basic object of the present invention is to provide a new method for detection and removal of rain from video by efficient rain removal which would avoid the afore discussed problems faced in the art.

Another object of the present invention is to provide a new method for detection and removal of rain from video by efficient rain removal methodology involving algorithm using temporal/spatiotemporal properties.

Another object of the present invention is to develop new technique for the detection and removal of rain from videos captured by the fixed camera as well as for video captured with moving camera, wherein the same technique can be applied after motion compensation of the frames.

A further object of the present invention is to develop a new technique using less number of consecutive frames, reducing the buffer size and delay.

A still further object of the present invention is to develop a new technique paves the way for the real time application.

Yet further object of the present invention is to develop a new technique adapted to work only on the intensity plane and thus reduce the complexity and execution time significantly.

A still further object of the present invention is to develop a new technique does not assume the shape, size and velocity of the raindrops which would make it robust to different rain conditions.

Yet further object of the present invention is to develop a new technique to detect and remove rain pixels by the classifier using temporal/spatiotemporal properties.

A still further object of the present invention is to develop a new technique reduces the buffer size which reduces the system cost, delay and power consumption.

SUMMARY OF THE INVENTION

Thus according to the basic aspect of the invention there is provided a method for detection and removal of rain from video comprising:

(i) discriminating rain and non-rain moving objects pixels involving different time evolution of intensity values of a pixel at a position in the rain and non-rain regions;

(ii) involving temporal/spatiotemporal discrimination in the single intensity plane; and (iii) inpainting of detected rain pixels by replacing it with the corresponding temporal mean of the intensity waveform.

A further aspect of the present invention is directed to a method for detection and removal of rain from video wherein said step of discriminating rain and non-rain regions comprises removal of edge pixels by removing moving and static edge pixels of the current frame and thereafter separating said rain and non-rain regions therefrom.

A still further aspect of the present invention is directed to said method for detection and removal of rain from video comprising involving the intensity variations of rain and non-rain pixels which differ by symmetry of waveform wherein the difference of the maximum and minimum of the pixel intensity waveform in rain regions are bound by a small threshold (T1) and absolute difference of the standard deviation of pixel intensity waveform above mean and below mean in rain regions are bound by Threshold (T2) which are used for discriminating of the rain and non-rain pixels.

A still further aspect of the present invention is directed to a method for detection and removal of rain from video wherein said spatiotemporal detection comprises extending window under observation in spatial domain which increase the numbers of pixels under observation and enable boosting the accuracy of statistical inference and with increase in spatial window its span in time domain is reduced, whereby the detection process requires less number of frames and the spatiotemporal pixel intensity wave-form can be obtained by the various scan orders and continuity is maintained in frame to frame transition.

According to yet another aspect of the present invention is directed to said method for detection and removal of rain from video comprising possible rain candidates selection in the $n^{th}$ frame, where intensities are $I^{n-m}{}_1, \ldots, I^{n+m}{}_2$ at each pixel location corresponding to the $m_1+m_2+1$ consecutive frames and generating intensity variations of these consecutive frames.

A still further aspect of the present invention is directed to a method for detection and removal of rain from video comprising spatiotemporal detection including temporal detection involving preferably selective number of consecutive frames.

According to a further aspect of the present invention is directed to a method for detection and removal of rain from video comprising detection and removal of rain from videos involving said spatiotemporal properties, comprising steps of;

i) converting the input RGB frame into the $YC_bC_r$ with chrominance component remain unchanged;

ii) selection of possible rain candidates by intensity changes of the selective number of consecutive frames for the detection of possible rain pixels;

iii) removal of edge pixels by refinement of rain pixels making remove the moving and static edge pixels of the current frame then eliminating of edge pixels;

iv) selection of features (attributes) to separate the rain and non-rain regions after the removal of edge pixels and for this separation, the nature of the variations of intensity values of pixels in consecutive frames is examined and intensity variations of rain and non-rain pixels differing by the symmetry of waveform, v) for example, estimating range of the difference of the maximum and minimum of the pixel intensity waveform in rain regions which is bound by a small threshold (say $T_1$), vi) for example, calculating spread asymmetry being absolute difference of the standard deviation of pixel intensity waveform above mean and below mean in rain regions is bound by a small threshold (say $T_2$), vii) making classification for the discrimination of the rain and non-rain pixels;

viii) inpainting of detected rain pixels achieved by replacing it with the corresponding temporal mean of the intensity waveform; and ix) achieving the $YC_bC_r$ to RGB by inpainted intensity plane and unchanged chrominance components and combining and converting into RGB plane.

A still further aspect of the present invention is directed to a system for detection and removal of rain from video involving the method comprising (a) means adapted for discriminating rain and non-rain moving objects pixels based on the rain and non-rain regions having different time evolution properties;

(b) means for said temporal/spatiotemporal discrimination in the single intensity plane; and (c) means for inpainting of detected rain pixels by replacing it with the corresponding temporal mean of the intensity waveform.

The details of the invention, its objects and advantages are explained hereunder in greater detail in relation to the following non-limiting exemplary illustrations as per the following accompanying figures:

The features and advantages of certain embodiments will be more readily appreciated when considered in conjunction with the accompanying figures. As described earlier, the figures are not to be construed as limiting any of the preferred embodiments.

DETAILED DESCRIPTION

Thus according to the present invention there is provided a novel rain removal method. Here to reduce the buffer size and delay of the method, a approach is introduced which uses the temporal/spatiotemporal properties of the rain. Proposed method works on the intensity plane rather than on all three color components, which reduces the complexity and execution time significantly.

Figure 1:
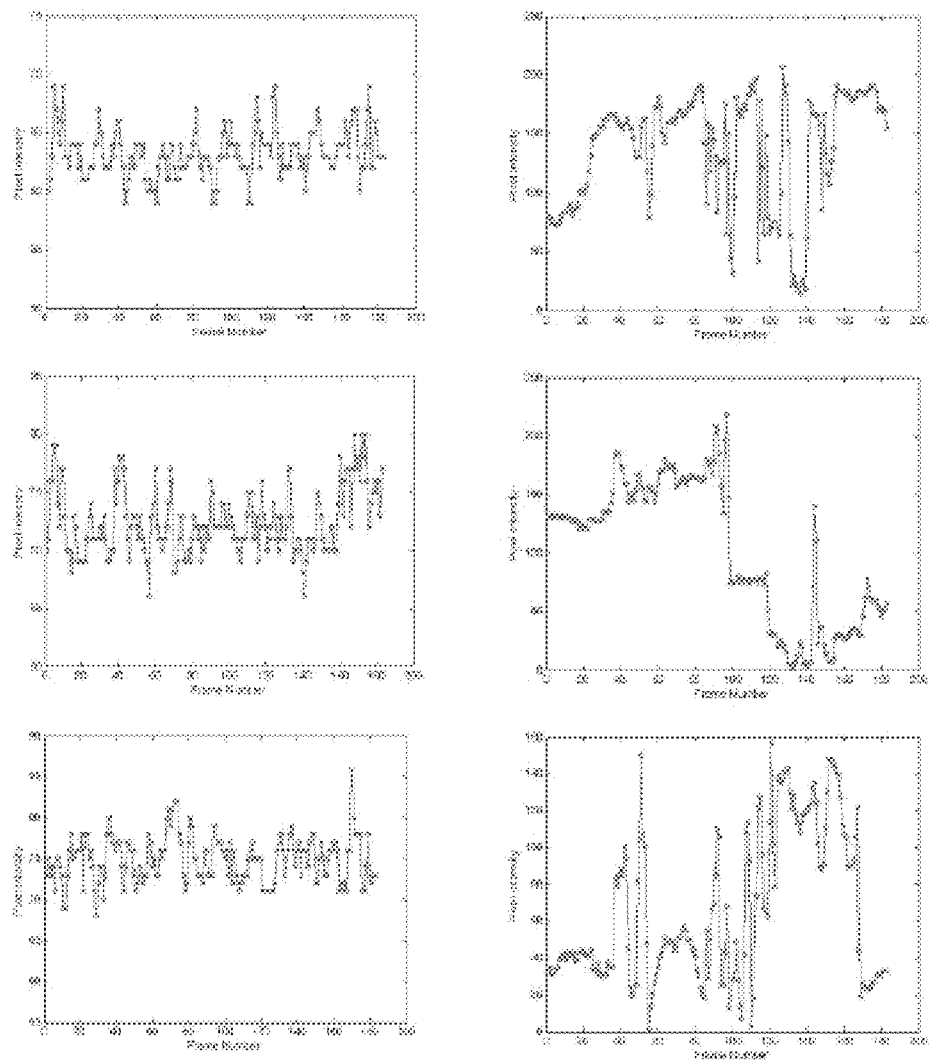
FIG. 1: is the graphical plot of pixel intensity wherein First column shows the plot of intensity values in consecutive frames for pixel present at particular position in rain region. Second column shows the same plot for pixel present at particular position in non-rain moving object region. Pixel present in non-rain region with constant background is the trivial case.
Figure 2:
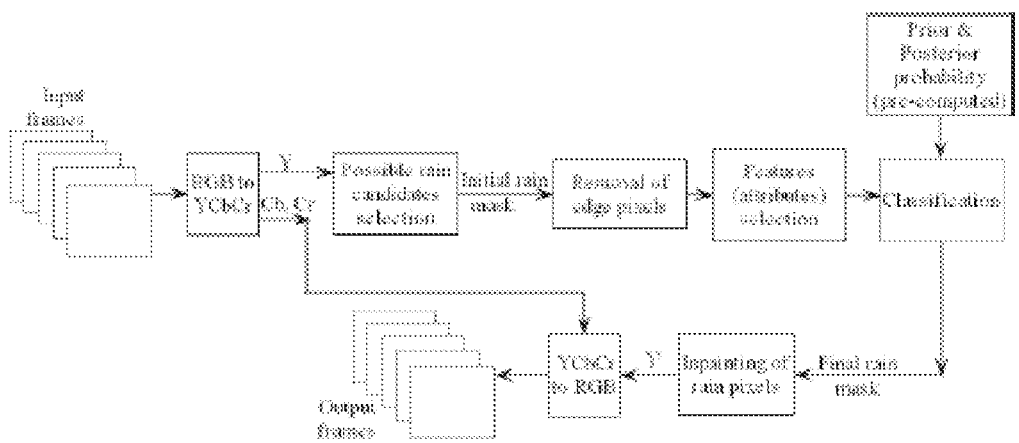
FIG. 2: is the schematic Block diagram showing the steps of proposed spatiotemporal rain removal methods.

Rain analysis show that rain gives positive fluctuations in the intensity values without affecting the chrominance values. These fluctuations are very small in nature. To analyze the nature of rain, time evolution of pixel variations is exploited. Time evolution of intensity values of a pixel at particular position present in rain region for consecutive frames is quiet different from the evolution of pixel present in moving object region. Intensity waveform for the rain and moving object pixels are shown in FIG. 1. For the rain pixel, intensity values below and above mean are more symmetric than those for the moving object pixel. In intensity plots range of y axis show that the intensity variations caused by the rain are small in comparison to caused by the moving objects. Accompanying FIG. 2 illustrates the Block diagram showing the steps of proposed spatiotemporal rain removal methods according to the present invention.

Figure 3:
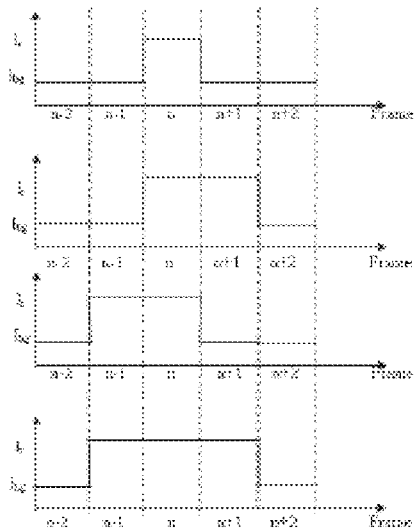
FIG. 3: is the schematic view of the intensity changes of consecutive frames due to rain.

Heavy rain may affect a particular position in two or three consecutive frames. Hence intensity changes of the selective number of consecutive frames have been examined for the detection of possible rain pixels. Schematic view of the intensity changes of consecutive frames due to rain is shown in FIG. 3.

Due to the presence of the moving objects this detection process contains some false rain pixels candidates. Inpainting of these false rain pixels produce some unrealistic effects. These effects are more visible on the edges. Thus this detection process requires some refinement. For refinement of rain pixels first remove the moving and static edge pixels of the current frame. This elimination of edge pixels also helps in producing more realistic result.

This elimination prevents the blurring of the moving objects at the rain inpainting step. After the removal of edge pixels separate the rain and non-rain regions. For this separation, the nature of the variation of intensity values of pixels in consecutive frame has been examined.

Since intensity variations of rain and non-rain pixels differ by the symmetry of waveform, for example, Difference of the maximum and minimum of the pixel intensity waveform in rain regions is bound by a small threshold (say $T_1$) for example, Absolute difference of the standard deviation of pixel intensity waveform above mean and below mean in rain regions is bound by a small threshold (say $T_2$).

For the discrimination of the rain and non-rain pixels, method requires the value of the threshold $T_1$ and $T_2$. These threshold values can be optimized by any classifier.

Inpainting of rain pixels: Intensity variations produced by the raindrops are somewhat symmetric about the mean of the intensities of consecutive frames at particular pixel position. Hence inpainting of detected rain pixels can be achieved by replacing it with the corresponding temporal mean of the intensity waveform.

Spatiotemporal detection: Temporal detection requires selective number of consecutive frames for good accuracy. Examinations of these consecutive frames increase the buffer size because buffer size increases proportionally with the number of frames. Large buffer size causes delay and add to the cost of the system. Hence to reduce the buffer size and delay, number of frames required for the detection process should be less. But reducing the number of frames simultaneously reduces the number of pixels available for statistical inference, which affects the estimation accuracy. Hence for obtaining sufficient pixels for observation, spatiotemporal detection is proposed in place of temporal detection process. Here the window under observation is extended in spatial domain and thus the numbers of pixels under observation increase and thus boost the accuracy of statistical inference. Along with increase in spatial window its span in time domain is reduced, which means the detection process requires less number of frames. Thus spatiotemporal window provides sufficient pixels for accurate statistical estimate without increasing the requirement of number of frames. In other words, for the spatiotemporal window, less number of frames (means less buffer size and delay) are required for the same detection accuracy. Temporal technique can be taken as a special case of spatiotemporal technique where the spatial window size is minimum (1×1).

Figure 4:
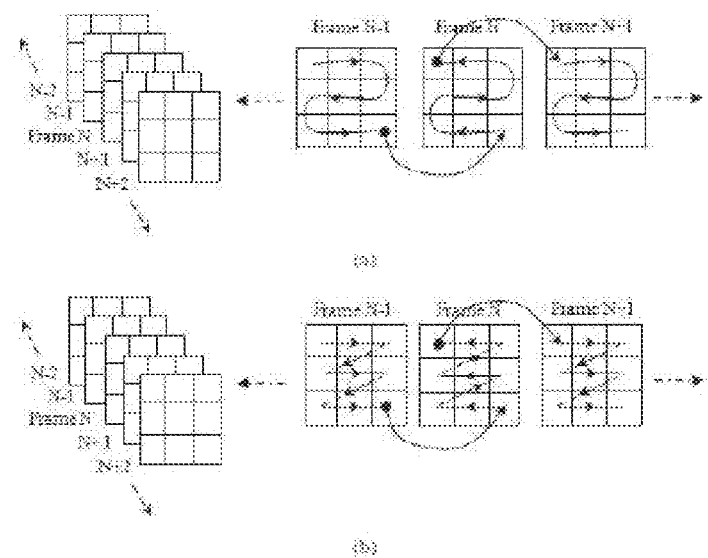
FIG. 4: is the schematic illustration of different scan orders for consecutive frames.

Pixel intensity waveform (FIG. 1) for the current pixel (Here, spatiotemporal pixel intensity wave-form) can be obtained by the various scan orders. One option could be the raster scanning. Here, we have presented two scan orders as shown in FIG. 4. It is noted that in both the scan orders, continuity is maintained in frame to frame transition. Thus pixel intensity waveforms for the rain pixels obtained through these scan orders are free from frame transition artifacts. However, the values of the attributes (range and spread asymmetry) used for the discrimination of rain and non-rain pixels are independent of the scan order. It means same result can be obtained by using any scan order by proper choice of features. Here scan orders are used only to visually analyze the behavior of the intensity variations caused by the rain and non-rain pixels in temporal domain.

Figure 5:
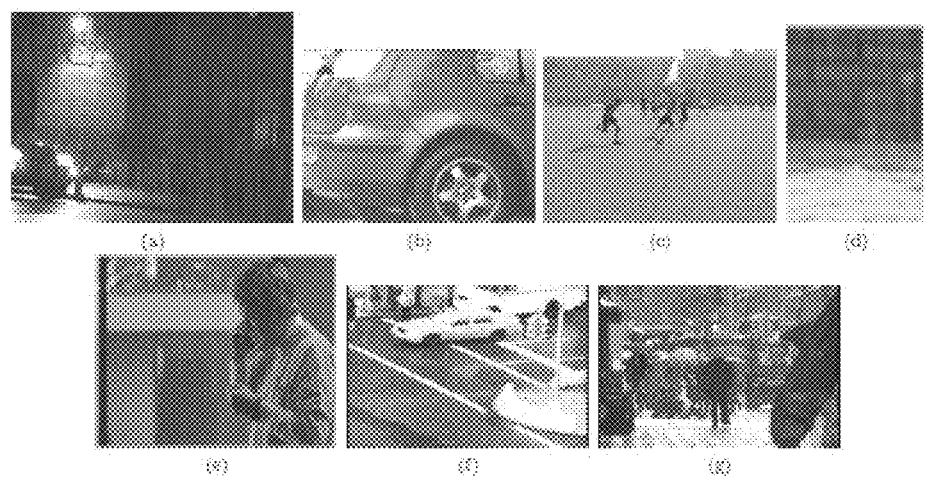
FIG. 5: Videos used for the simulation (a) 'black car', (b) 'blue car', (c) 'football', (d) 'pool', (e) 'magnolia', (f) 'street' and (g) 'street01'.
Figure 6:
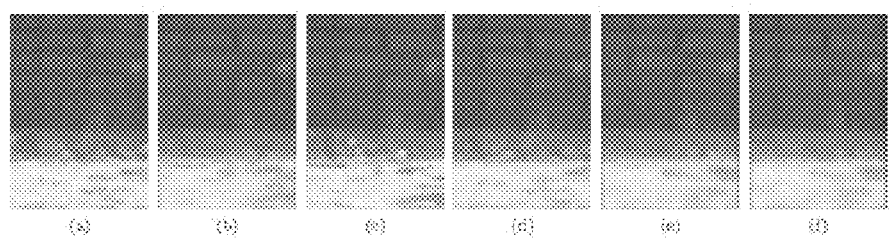
FIG. 6: (a) Original 'pool' rain video (frame 40), rain removed by (b) Zhang et al method, (c) Garg and Nayar Method, (d) Liu et al Method, (e) temporal Method, and (f) Proposed spatiotemporal method.

Proposed method works only on the intensity plane. Hence prior to the detection and inpainting of the rain pixels, input RGB frame is converted into the $YC_bC_r$ color space. Chrominance components ($C_b$ and $C_r$) are remain unchanged as shown in FIG. 2. Videos used for the simulation are shown in FIG. 5. Quantitative performance of detection process is analyzed in terms of miss & false detection. For the proposed method miss and false detection is calculated at various 3D window size. Size of the window can be adjusted according to the size of the buffer.

The performance of rain detection degrades due the presence of dynamic objects irrespective of the detection technique used. Results show that number of miss & false detection (and Error) for proposed methods are very low in comparison with most of the competing rain removal methods and very close to the temporal rain removal method.

The spatiotemporal method performance of the rain removal process increases with the increase in number of frames. For lower number of frames increase in spatial window increases the accuracy of detection. Hence, a large saving in buffer size and delay can be obtained with little sacrifice in image quality. The use of spatiotemporal window though increases the number of samples in intensity waveform the increase in computational load is not much due to the use of simple features. Hence, the use of spatiotemporal window provides flexibility to the designer to choose the right parameters for the system.

Simulation of proposed rain removal method is carried out in videos with static background ('pool' video) and dynamic or moving objects background ('magnolia', 'street' and 'street01') as shown in FIG. 5. Removal of rain from a video produces a smooth background. It means removal process removes the intensity variations in consecutive frames. Quantitative performance of removal process is analyzed in terms of variance. Lower the value of variance means better is the method. Results show that proposed method gives low value of variance in comparison with other competing methods and nearly similar to the temporal method.

Figure 7:
FIG. 7: (a) Original 'magnolia' rain video (frame 45), rain removed by (b) Zhang et al method, (c) Garg and Nayar Method, (d) Liu et al Method, (e) temporal Method, and (f) Proposed spatiotemporal method.
Figure 8:
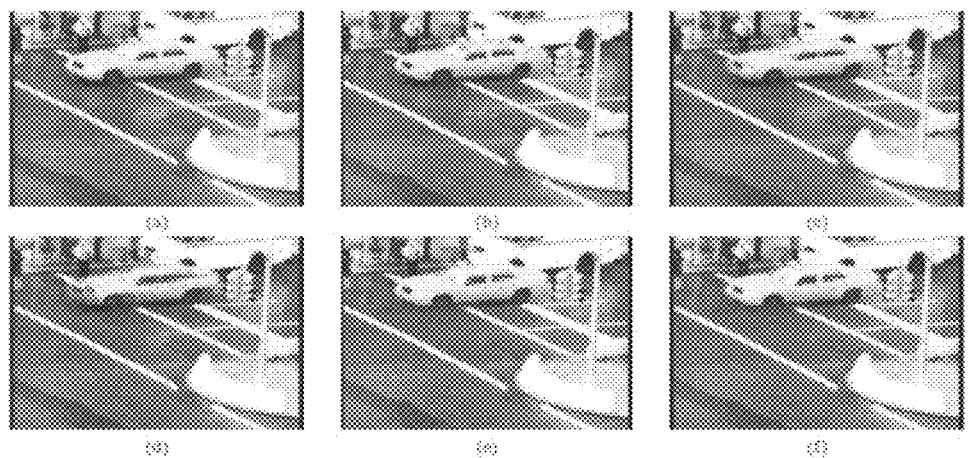
FIG. 8: (a) Original 'street' rain video (frame 81), rain removed by (b) Zhang et al method, (c) Garg and Nayar Method, (d) Liu et al Method, (e) temporal Method, and (f) Proposed spatiotemporal method.
Figure 9:
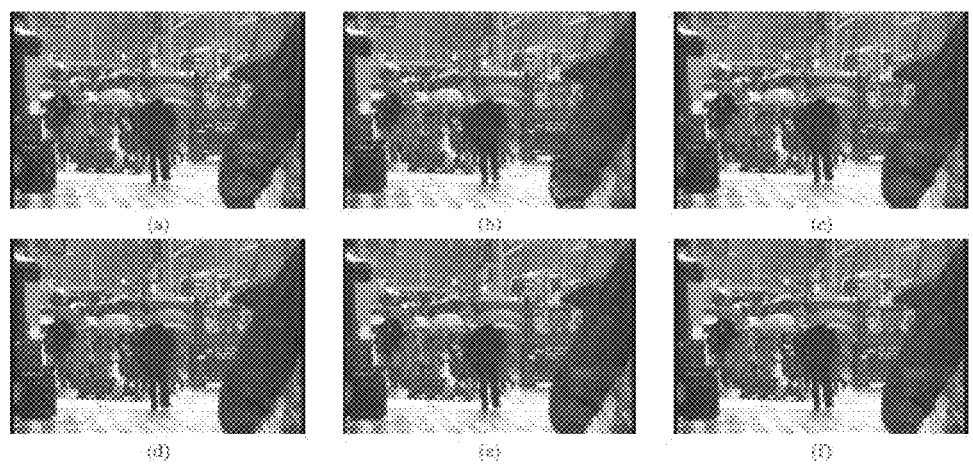
FIG. 9: (a) Original 'street01' rain video (frame 50), rain removed by (b) Zhang et al method, (c) Garg and Nayar Method, (d) Liu et al Method, (e) temporal Method, and (f) Proposed spatiotemporal method.

Qualitative results are shown in FIG. 6, FIG. 7, FIG. 8, and FIG. 9. Results show that the proposed method removes rain effectively than other examined rain removal methods in terms of the perceptual image quality. Other examined methods except the temporal rain removal method produce some degradation. In 'magnolia' video, these degradations are more visible near the fingers of the man (FIG. 7). In 'street' video, degradations can be seen over the yellow car (FIG. 8). In 'street01' video, degradations are over the hand shown in right part of the video (FIG. 9). Proposed method produce the same visual quality as produced by the temporal method (i.e. no degradations in image quality) but with the advantage of less buffer size and delay.

Thus by way of the present invention a temporal and—spatiotemporal rain removal method is proposed. Here rain pixels and non-rain moving objects pixels are discriminated by the classifier. It is analyzed that rain and non-rain regions have different time evolution properties. Proposed methods use these properties to separate the rain pixels from the non-rain pixels. Temporal rain removal method, discrimination process requires large number of consecutive frames which cause large buffer size and delay. Here instead of using large number of consecutive frames, a spatiotemporal approach is proposed. This new approach reduces the buffer size and delay. Thus proposed method paves the way for the real time implementation. Quantitative and qualitative results show that proposed method removes rain effectively in comparison with most of the competing rain removal methods. Similar to the temporal rain removal method proposed spatiotemporal method works only on the intensity plane. Thus use of single plane reduces the complexity and execution time of the method. Proposed method does not assume the shape, size and velocity of raindrops which makes it robust to different rain conditions. In summary, proposed method has outperformed other competing methods in terms of the buffer size, delay and perceptual visual quality and provides flexibility of design.

While the present invention may have been described through reference to specific embodiments, the invention is not limited to these specific embodiments as other embodiments and variations are within the scope of the invention.

We claim:

1. A method for detection and removal of rain from video comprising:
   (i) discriminating rain and non-rain moving objects pixels involving different time evolution of intensity values of a pixel at a position in the rain and non-rain regions by carrying out temporal or spatiotemporal discrimination in the single intensity plane whereby the rain and non rain moving object pixels are discriminated based on their difference in symmetry of waveform; and
   (ii) inpainting of thus detected rain pixels by replacing it with the corresponding temporal mean of the intensity waveform.

2. The method for detection and removal of rain from video as claimed in claim 1, wherein said step of discriminating rain and non-rain regions comprises removal of edge pixels by removing moving and static edge pixels of the current frame and thereafter separating said rain and non-rain regions therefrom.

3. The method for detection and removal of rain from video as claimed in claim 1, comprising involving the intensity variations of rain and non-rain pixels which differ by symmetry of waveform wherein the difference of the maximum and minimum of the pixel intensity waveform in rain regions are bound by a small threshold ($T_1$) and absolute difference of the standard deviation of pixel intensity waveform above mean and below mean in rain regions are bound by Threshold ($T_2$) which are used for discriminating of the rain and non-rain pixels.

4. The method for detection and removal of rain from video as claimed in claim 1, wherein said spatiotemporal detection comprises extending window under observation in spatial domain which increase the numbers of pixels under observation and enable boosting the accuracy of inference and with increase in spatial window its span in time domain is reduced, whereby the detection process requires less number of frames and the spatiotemporal pixel intensity wave-form can be obtained by the various scan orders and continuity is maintained in frame to frame transition.

5. The method for detection and removal of rain from video as claimed in claim 1 comprising possible rain candidates selection in the nth frame, where intensities are $I^{n-m_1}, \ldots I^{n+m_2}$ at each pixel location corresponding to the consecutive frames $n-m_1$ to $n+m_2$ respectively and generating intensity variations of m1+m2+1 consecutive frames.

6. The method for detection and removal of rain from video as claimed in claim 1 comprising spatiotemporal detection including temporal detection involving selective number of consecutive frames.

7. The method for detection and removal of rain from video as claimed in claim 1 comprising detection and removal of rain from videos involving said temporal or spatiotemporal properties, comprising steps of:
i) converting the input RGB frame into the $YC_bC_r$ with chrominance component remain unchanged;
ii) selection of possible rain candidates by intensity changes of the selective number of consecutive frames for the detection of possible rain pixels;
iii) removal of edge pixels by refinement of rain pixels making remove the moving and static edge pixels of the current frame then eliminating of edge pixels;
iv) selection of features (attributes) to separate the rain and non-rain regions after the removal of edge pixels and for this separation, the nature of the variations of intensity values of pixels in consecutive frames is examined and intensity variations of rain and non-rain pixels differing by the symmetry of waveform,
v) for example, estimating range of the difference of the maximum and minimum of the pixel intensity waveform in rain regions which is bound by a small threshold (say $T_1$);
vi) for example, calculating spread asymmetry being absolute difference of the standard deviation of pixel intensity waveform above mean and below mean in rain regions is bound by a small threshold (say $T_2$),
vii) making classification for the discrimination of the rain and non-rain pixels;
viii) inpainting of detected rain pixels achieved by replacing it with the corresponding temporal mean of the intensity waveform; and
ix) achieving the $YC_bC_r$ to RGB by inpainted intensity plane and unchanged chrominance components and combining and converting into RGB plane.

8. The method for the detection and removal of rain from videos as claimed in claim 1, wherein said video is captured by fixed camera as well as with moving camera, wherein the said method is applied after motion compensation of the frames.

* * * * *